(12) United States Patent
Ansorge et al.

(10) Patent No.: US 8,641,790 B2
(45) Date of Patent: Feb. 4, 2014

(54) PROCESS FOR THE SYNTHESIS OF HYDROCARBONS FROM A CARBONACEOUS FUEL

(75) Inventors: Joachim Ansorge, The Hague (NL); Scott Bilton, Amsterdam (NL); Hendrik Jan Van Der Ploeg, Amsterdam (NL); Arold Marcel Albert Routier, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1568 days.

(21) Appl. No.: 11/794,515

(22) PCT Filed: Dec. 29, 2005

(86) PCT No.: PCT/EP2005/057217
§ 371 (c)(1),
(2), (4) Date: Jun. 28, 2007

(87) PCT Pub. No.: WO2006/070018
PCT Pub. Date: Jul. 6, 2006

(65) Prior Publication Data
US 2010/0031572 A1    Feb. 11, 2010

(30) Foreign Application Priority Data
Dec. 30, 2004   (EP) .................................... 04107067

(51) Int. Cl.
*C01B 3/24*   (2006.01)
(52) U.S. Cl.
USPC ........................................................ 48/127.1

(58) Field of Classification Search
USPC .................................. 48/197 R–197 A, 127.1
See application file for complete search history.

(56) References Cited

U.S. PATENT DOCUMENTS

| 4,443,561 A | 4/1984 | Boelema et al. ............... 518/704 |
| 5,441,990 A | 8/1995 | Robin et al. ................... 518/703 |
| 2002/0144929 A1 | 10/2002 | Moore, Jr. et al. | |
| 2004/0101473 A1 | 5/2004 | Wang et al. .................... 423/651 |

FOREIGN PATENT DOCUMENTS

| EP | 450861 | 10/1991 | ............... C07C 1/04 |
| EP | 510771 | 10/1992 | ............... B01J 37/00 |
| FR | 2856048 | 12/2004 | ............. B01D 53/86 |
| WO | WO0074838 | 12/2000 | ................ B01J 7/00 |
| WO | WO0176736 | 10/2001 | ............... B01J 23/74 |
| WO | WO0202489 | 1/2002 | ............... C07C 1/04 |
| WO | WO0207882 | 1/2002 | ............... B01J 37/02 |

OTHER PUBLICATIONS

International Search Report dated Feb. 24, 2006.

*Primary Examiner* — Imran Akram

(57) ABSTRACT

A method of increasing the hydrogen/carbon monoxide ($H_2$/CO) ratio in a syngas stream derived from a carbonaceous fuel including coal, brown coal, peat, and heavy residual oil fractions, preferably coal. The fuel-derived syngas stream is divided into at least two sub-streams, one of which undergoes a catalytic water shift conversion reaction. The so-obtained converted sub-stream is combined with the non-converted sub-stream(s) to form a second syngas stream with an increased $H_2$/CO ratio. The method of the present invention can provide a syngas with a $H_2$/CO ratio more suitable for efficient hydrocarbon synthesis carried out on a given catalyst, such as in one or more Fischer-Tropsch reactors, as well as being able to accommodate variation in the $H_2$/CO ratio of syngas formed from different qualities of feedstock fuels.

4 Claims, 2 Drawing Sheets

PROCESS FOR THE SYNTHESIS OF HYDROCARBONS FROM A CARBONACEOUS FUEL

CROSS REFERENCE TO EARLIER APPLICATION

This is a national stage application of International application no. PCT/EP2005/057217, filed 29 Dec. 2005, which claims priority of European application no. 04107067.3, filed 30 Dec. 2004.

FIELD OF THE INVENTION

The present invention relates to improvements relating to coal and other heavy hydrocarbonaceous feedstocks to liquid processes, particularly but not exclusively Fischer-Tropsch processes.

BACKGROUND OF THE INVENTION

The Fischer-Tropsch process can be used for the conversion of hydrocarbonaceous feedstocks into liquid and/or solid hydrocarbons. The feedstock (e.g. natural gas, associated gas, coal-bed methane, heavy oil residues, coal) is converted in a first step into a mixture of hydrogen and carbon monoxide (this mixture is often referred to as synthesis gas or syngas). The synthesis gas is then fed into a reactor where it is converted over a suitable catalyst at elevated temperature and pressure into paraffinic compounds ranging from methane to high molecular weight molecules comprising up to 200 carbon atoms, or, under particular circumstances, even more. Examples of the Fischer-Tropsch process are described in e.g. WO 02/02489, WO 01/76736, WO 02/07882, EP 510771 and EP 450861.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

As mentioned above, "coal" and heavy oil residues are examples of feedstocks for the Fischer-Tropsch process. However, there are many solid or very heavy (viscous) fossil fuels which may be used as feedstock for the process, including solid fuels such as anthracite, brown coal, bituminous coal, sub-bituminous coal, lignite, petroleum coke, peat and the like, and heavy residues, e.g. hydrocarbons extracted from tar sands, residues from refineries such as residual oil fractions boiling above 360° C., especially above 550° C., more especially above 750° C., directly derived from crude oil, or from oil conversion processes such as thermal cracking, catalytic cracking, hydrocracking etc. All such types of fuels have different levels of 'quality', that is the proportions of carbon and hydrogen, as well as substances regarded as 'impurities', generally sulphur and sulphur-based compounds, nitrogen containing compounds, heavy metals etc.

Gasification of solid carbonaceous fuels such as coal is well known, and generally involves milling or otherwise grinding the fuel to a preferred size or size range, followed by heating the fuel with oxygen in a gasifier. This creates the mixture of hydrogen and carbon monoxide referred to as syngas. However, the proportion of carbon and hydrogen in solid carbonaceous fuels is generally such that the hydrogen/carbon monoxide ($H_2/CO$) ratio in the syngas formed is generally less than 1, whereas Fischer-Tropsch processes based on cobalt-catalysts generally desire a $H_2/CO$ ratio in the syngas to the synthesis reactor from 1.5 to 2.0, frequently 1.6-1.8. Higher ratio syngases are also desired for other parts or sections of a Fischer-Tropsch plant: some parts may desire a substantially pure hydrogen stream, that is, a very high $H_2/CO$ ratio. Further in the case that the Fischer-Tropsch process comprises two or more stages, additional hydrogen is needed between these stages. The additional hydrogen may be pure hydrogen, but, preferably, is syngas having a high $H_2/CO$ ratio.

It is an object of the present invention to increase the $H_2/CO$ ratio in the syngas derived from a range of carbonaceous fuels ready for hydrocarbon synthesis processes such as the Fischer-Tropsch reaction.

SUMMARY OF THE INVENTION

The present invention provides a method of increasing the hydrogen/carbon monoxide ($H_2/CO$) ratio in a syngas stream derived from a solid carbonaceous fuel, wherein the fuel-derived syngas stream is divided into at least two sub-streams, one of which undergoes a catalytic water shift conversion reaction, and the so-obtained converted sub-stream is combined with a non-converted sub-stream(s) to form a syngas stream having an increased $H_2/CO$ ratio of between 1.1 and 1.95.

The present invention also provides a process for the preparation of a hydrogen-enriched syngas derived from a carbonaceous fuel as herein defined, wherein a portion of the syngas undergoes a catalytic water shift conversion reaction. Preferably the portion of syngas undergoing this shift conversion reaction is in the range 30-70% by volume of the syngas.

The present invention also provides syngas whenever prepared by a method or process as herein described.

The present invention also provides a hydrocarbonaceous product whenever produced by the use of syngas as herein described, including any products made by hydroconversion of the hydrocarbonaceous products.

According to one embodiment of the present invention, the present invention provides a process for the synthesis of hydrocarbons from a carbonaceous fuel, comprising the steps of:

gasifying the carbonaceous fuel with a supply of oxygen to provide syngas;
removing solids from the syngas;
dividing the syngas into at least two sub-streams, one of which undergoes a catalytic water shift conversion reaction;
combining said sub-streams to provide a syngas having an increased $H_2/CO$ ratio;
feeding said combined syngas to a hydrocarbon synthesis section to produce the hydrocarbons.

Preferably, the syngas, either in its combined form, or each substream, or both, undergoes a $CO_2/H_2S$ removal or treatment step prior to the hydrocarbon synthesis section.

The invention further provides a process for the synthesis of hydrocarbons from a carbonaceous fuel, comprising the steps of:

gasifying the carbonaceous fuel with a supply of oxygen to provide syngas;
removing solids from the syngas;
dividing the syngas into at least three sub-streams, two of which undergoes a catalytic water shift conversion reaction;
combining two sub-streams to provide a syngas having an increased $H_2/CO$ ratio; feeding said combined syngas into a hydrocarbon synthesis section to produce the hydrocarbons, in which the hydrocarbon synthesis process comprises at least 2 or 3 stages, wherein the third, shifted gas-stream is used as additional feed for the further stages. In the above process the two sub-streams for the catalytic water shift conversion may also be shifted together, followed by a separation step.

In any of the above, the carbonaceous fuel may include coal, brown coal, peat, and heavy residual oil fractions, preferably coal.

Without wishing to be restricted to a particular embodiment, the invention will now be described in further detail with reference to the drawings.

DETAILED DESCRIPTION

Figure 1:
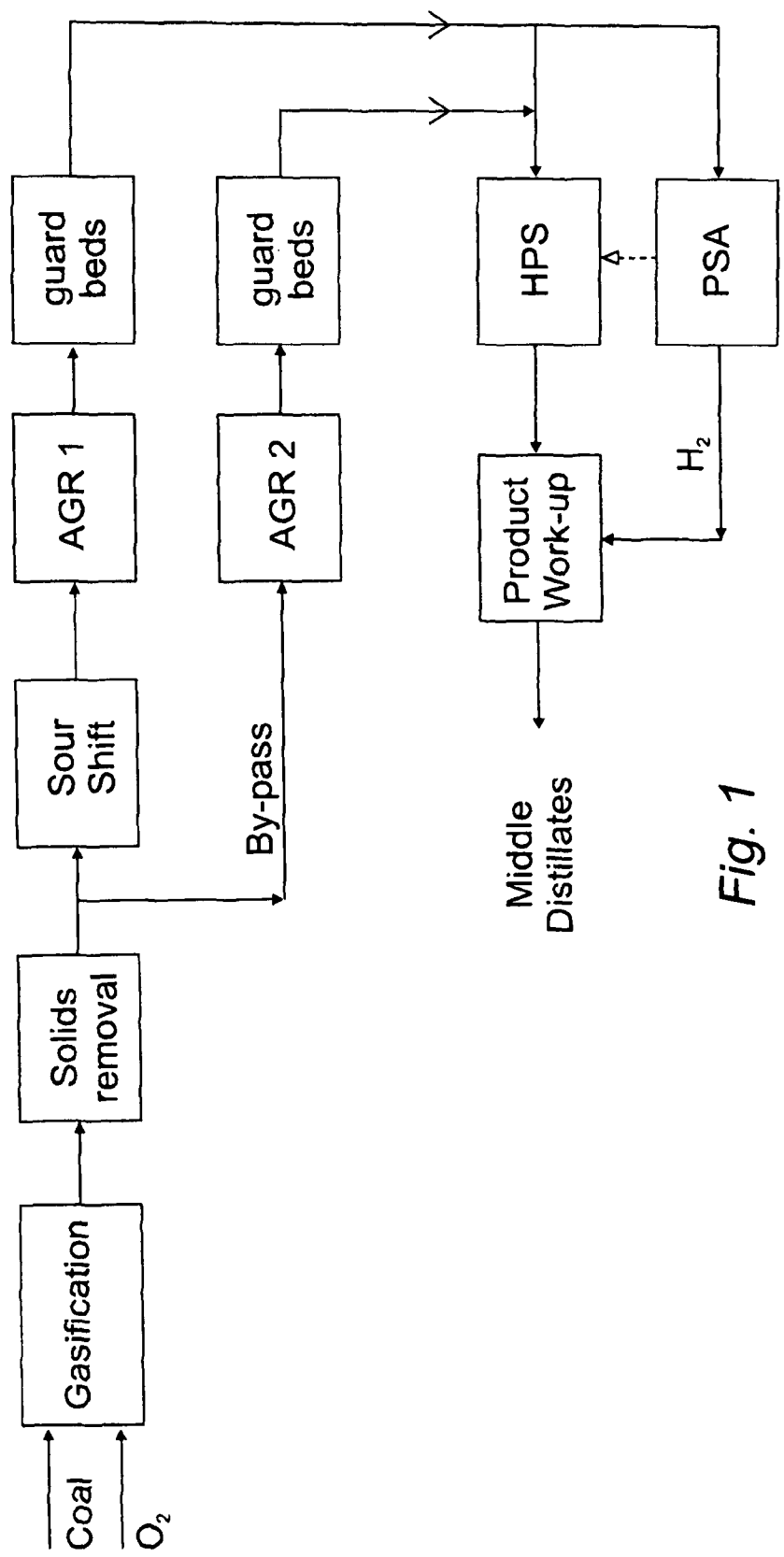
FIG. 1 is a flow diagram of a first arrangement for the method of the present invention.

For the purpose of the present specification, the term carbonaceous fuel includes coal, brown coal, peat, and heavy residual oil fractions, preferably coal.

The $H_2/CO$ ratio in syngas formed by gasification of most types of carbonaceous fuels defined herein is generally about or less than 1, and is commonly about 0.3-0.6 for coal-derived syngas, and 0.5-0.9 for heavy residue-derived syngas. It is possible to use such a $H_2/CO$ ratio in a Fischer-Tropsch process, but more satisfactory results can be achieved by increasing the $H_2/CO$ ratio.

The present invention allows for the increase of the $H_2/CO$ ratio in the syngas to a ratio, which is known to provide more satisfactory results during the synthesis step, especially higher quality and higher selectivity of the hydroconversion synthesis. Preferably the $H_2/CO$ ratio in the second syngas stream formed by the combination of the sub-streams is greater than 1.5, preferably in the range 1.6-1.9, and more preferably in the range 1.6-1.8. It is observed that for the establishment of the combined $H_2/CO$ ratio any premixing of the two streams should be disregarded. Thus, in the case of recycling any gas streams comprising unconverted syngas, e.g. from the Fischer-Tropsch process, the influence of the $H_2$ and CO in the recycle stream should not be taken into account.

The present invention allows for the division of the fuel-derived syngas stream into any number of streams, more than one of which could undergo a catalytic water shift conversion reaction. In the simplest arrangement, the fuel-derived syngas stream is divided into two sub-streams, one of which undergoes the conversion reaction.

If desired or necessary, some of the non-converted sub-stream(s) could be used for other parts of the hydrocarbon conversion process rather than being combined with the converted sub-stream(s), e.g. for a second, third etc. stage in the Fischer-Tropsch process, for steam or power generation, or for the manufacture of hydrogen.

The division of the fuel-derived syngas stream into sub-streams can be such so as to create any desired $H_2/CO$ ratio following their recombination. Any degree or amount of division of the fuel-derived syngas stream is possible. Where the fuel-derived syngas stream is divided into two sub-streams, the division into the sub-streams could be in the range 80:20 to 20:80 by volume, preferably 70:30 to 30:70 by volume, depending upon the desired final $H_2/CO$ ratio. Simple analysis of the $H_2/CO$ ratios in the fuel-derived syngas stream and knowledge of the desired ratio in the combined syngas stream allows easy calculation of the division. In the case that one stream is to be used as feed for e.g. the second stage of a Fischer-Tropsch process, this stream will usually be between 10 and 50%, preferably between 20 and 35% of the stream which is catalytically shifted. In that case there are three stream, the two main streams in the range 80:20 to 20:80 by volume and one stream 10 to 50% of one of the earlier two streams.

The simple ability to change the degree of division of the fuel-derived syngas stream into the sub-streams also provides a simple but effective means of accommodating variation in the $H_2/CO$ ratio in the fuel-derived syngas stream, primarily due to variation in feedstock quality, i.e. the hydrogen and carbon content of the original fuel, for example, the 'grade' of coal. Certain grades of coal generally having a higher carbon content, but a high carbon content, will, after gasification of the coal, provide a greater production of carbon monoxide, and thus a lower $H_2/CO$ ratio. However, using other grades of coal means removing more contaminants or unwanted parts of the coal, such as ash and sulphur and sulphur-based compounds. It is observed that it also possible to divide the original syngas stream into two streams, followed by a catalytic shift of one of the streams, followed by further division of the shifted stream, e.g. one for combining with the other stream, one for use as additional feed in the second stage and one for the preparation of hydrogen.

The ability to change the degree of division of the fuel-derived syngas stream into the sub-streams allows the present invention to be used with a variety of fuel feedstocks, generally 'raw' coal, without any significant re-engineering of the process or equipment to accommodate expected or unexpected variation in such coals.

Turning to FIG. 1, there is shown a process for the synthesis of hydrocarbons from coal. This starts with the gasification of coal with oxygen to form a syngas stream, followed by removal of solids such as slag and the like. The fuel-derived syngas stream is then divided into two streams. One forms a 'by-pass' stream, which passes through a $CO_2/H_2S$ removal system labelled 'AGR 2' followed by one or more guard beds and/or scrubbing units, either as backup or support to the $CO_2/H_2S$ removal system, or to assist in the reduction and/or removal of other contaminants such as HCN, $NH_3$, COS and $H_2S$, etc.

The other stream of syngas passes into a sour shift unit to undergo a catalytic water shift conversion reaction wherein the $H_2/CO$ ratio is significantly increased, optionally in a manner known in the art. The gas stream from the sour shift unit then undergoes the same or similar $CO_2/H_2S$ removal using unit 'AGR 1', followed by the same or similar guard beds as the other syngas stream.

The shifted syngas stream is then re-combined with the non-converted syngas stream prior to their entry into a heavy paraffin synthesis process, which may involve one or more reactors or units in one or more stages. The products provided by the HPS can then be worked up in a manner known in the art to provide distillates, such as middle distillates.

FIG. 1 shows the possible use of a part of the shifted syngas stream into a pressure swing adsorption unit, wherein the shifted syngas is converted to provide a hydrogen enhanced stream, which stream can then be used in the hydrocracking in the product workup.

Figure 2:
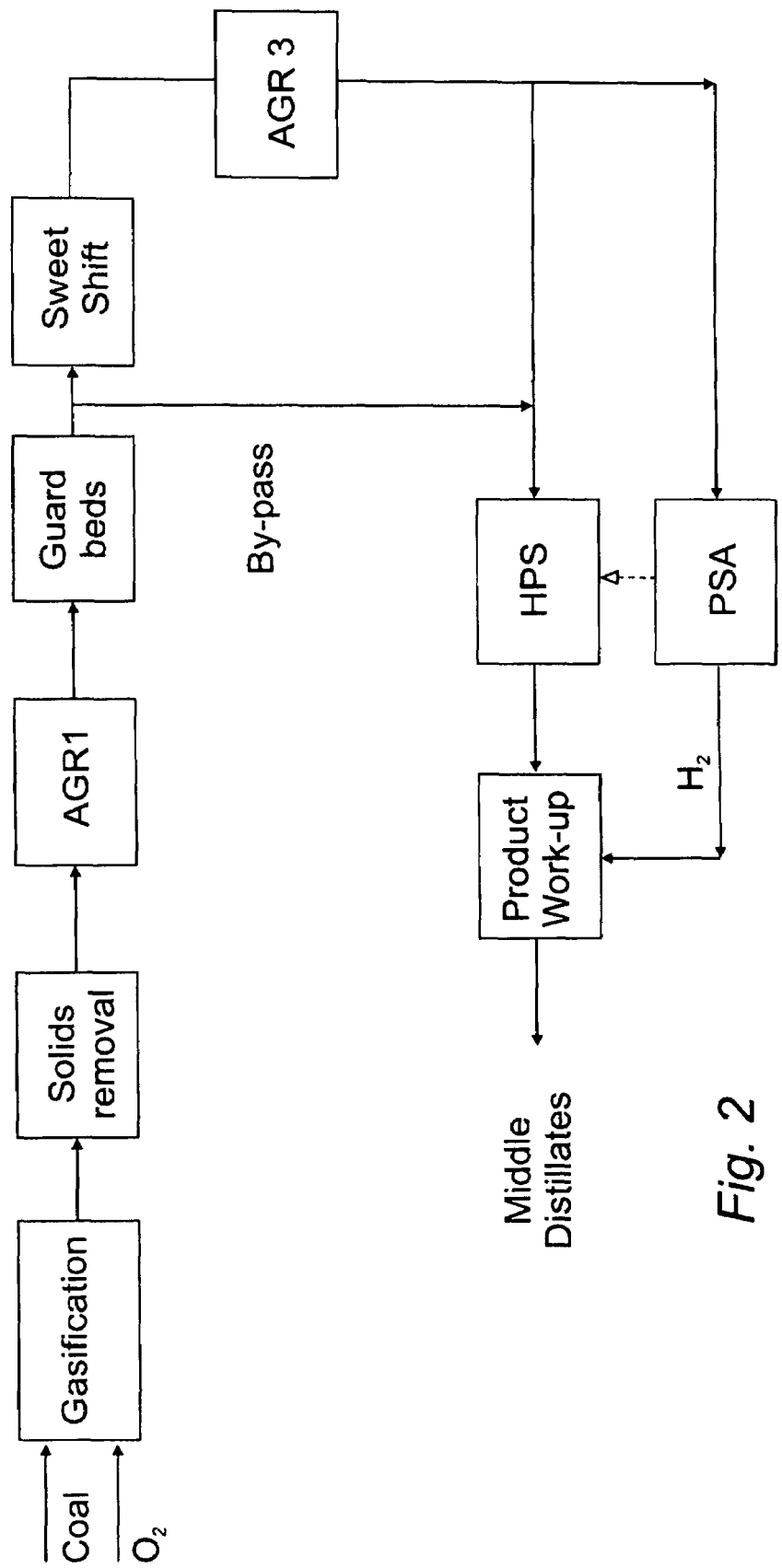
FIG. 2 is of a flow diagram of a second arrangement of the method of the present.

FIG. 2 shows a similar process to FIG. 1. However, in the process shown in FIG. 2, the AGR 1 unit provides the $CO_2/H_2S$ cleaning of the syngas stream prior to division. After the AGR and guard beds, the syngas stream is then divided, such that part of the stream by-passes directly towards the HPS stage. Meanwhile, the other divided syngas stream undergoes a sweet shift conversion, followed by subsequent $CO_2/H_2S$ cleaning in unit 'AGR 3', which should not need to treat for $H_2S$. The converted sweet shift stream can then be wholly or substantially combined with the non-converted by-pass stream to provide a syngas stream entering the HPS stage with an enhanced the $H_2/CO$ ratio as desired.

Like FIG. 1, a part of the shifted stream could be supplied to a PSA unit for the provision of an enchanced hydrogen stream.

The gasification of coal is well known in the art. Generally, the coal is milled to a desired particle size or particle size range, before being transported to a gasifier. The gasifier requires the input of an oxygen stream. One source of oxygen could be an air separation unit, which divides air into its nitrogen and oxygen components.

According to one embodiment of the present invention, the nitrogen component from an air separation unit is admixed with the carbonaceous fuel feedstock, either prior to, during and/or after milling. Alternatively, or additionally, carbon dioxide gas, such as that derived from some part of the processed described herein, could be admixed with the fuel feedstock, either prior to, during and/or after milling.

In this way, the nitrogen or carbon dioxide assists in transport of such a feedstock to the gasifier by 'fluidising' the feedstock bed.

The method of the present invention especially concerns a Fischer-Tropsch process which comprises two or more stages to convert the synthesis gas into hydrocarbonaceous products. In principle it is possible to convert the syngas in one stage into hydrocarbons, however, it is more efficient to use two or more stages, preferably two or three stages, more preferably two stages. For instance, two stages in each of which the CO-conversion is 80%, results in a total CO-conversion of 96%. In the case that the $H_2/CO$ ratio to the first stage is below the consumption ratio (in general 2.05), e.g. when the $H_2/CO$ ratio to the first stage is below 1.95, e.g. between 1.3-1.9, especially between 1.6-1.8, the $H_2/CO$ ratio of the feedstream to the second feedstream, i.e. the $H_2/CO$ ratio of the product stream has been decreased considerably. It is especially suitably to send at least a part, preferably between 5 and 50% vol, more preferably between 10 and 40% vol, even more preferably between 15 and 35% vol of the shifted stream to the further stages in the Fischer-Tropsch process, especially to the second and third stage, more especially to the second stage. In a further preferred embodiment part of the unconverted syngas in the product stream is recirculated to the feedstream. Preferably 30-95 vol % is recirculated, more preferably 50-80 vol %. The CO conversion per pass is suitably between 30 and 65%. The total CO conversion per stage is suitably between 60 and 95%, preferably between 70 and 90%. The weight ratio recirculation gas: fresh synthesis gas is suitably between 0.2:1.0 till 4.0:1.0, preferably between 0.5:1.0 till 3.0:1.0, more preferably between 1.0:1.0 till 2.0:1.0. In this way an optimum $C_{5+}$ selectivity is obtained in an optimum sized reactor. In general, for each reactor in a further stage there are 1 to 10 reactors in the previous stage, preferably 2 to 8, more preferably 3 to 6. Thus, a three stage Fischer-Tropsch process could comprise 12 reactors in the first stage, 4 in the second stage and 1 in the third stage.

Preferably, the syngas still passes through a carbon dioxide/hydrogen sulphide ($CO_2/H_2S$) removal system, as the fuel-derived stream, the combined stream, and/or one or more, possibly all, of the sub-streams. The removal system may involve one or more removal units. Preferably, at least one such unit is located downstream from the conversion reaction, as carbon dioxide is a product thereof.

In one embodiment of the present invention, a $CO_2/H_2S$ removal unit is located in the path of each sub-stream.

The $CO_2/H_2S$ removal system preferably uses a physical solvent process, especially methanol or sulfolan, preferably methanol. This process is based on carbon dioxide and hydrogen sulphide being highly soluble under pressure in the solvent, and then being readily releasable from solution when the pressure is reduced as further discussed below. This high pressure system is preferred due to its efficiency, although other removal systems such as using amines are known.

It is preferred to remove at least 80 vol %, preferably at least 90 vol %, more preferably at least 95 vol % and at most 99.5 vol %, of the carbon dioxide present in the catalytically shifted syngas stream. This avoids the build-up of inerts in the Fischer-Tropsch process.

On an industrial scale there are chiefly two categories of absorbent solvents, depending on the mechanism to absorb the acidic components: chemical solvents and physical solvents. Each solvent has its own advantages and disadvantages as to features as loading capacity, kinetics, regenerability, selectivity, stability, corrosivity, heat/cooling requirements etc.

Chemical solvents which have proved to be industrially useful are primary, secondary and/or tertiary amines derived alkanolamines. The most frequently used amines are derived from ethanolamine, especially monoethanol amine (MEA), diethanolamine (DEA), triethanolamine (TEA), diisopropanolamine (DIPA) and methyldiethanolamine (MDEA).

Physical solvents which have proved to be industrially suitable are cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols.

A well-known commercial process uses an aqueous mixture of a chemical solvent, especially DIPA and/or MDEA, and a physical solvent, especially cyclotetramethylene-sulfone. Such systems show good absorption capacity and good selectivity against moderate investment costs and operational costs. They perform very well at high pressures, especially between 20 and 90 bara.

The physical adsorption process useable in the present invention is well known to the man skilled in the art. Reference can be made to e.g. Perry, Chemical Engineerings' Handbook, Chapter 14, Gas Absorption. The absorption process useable in the present process is a physical process. Suitable solvents are well known to the man skilled in the art and are described in the literature. In the present process the liquid absorbent in the physical absorption process is suitably methanol, ethanol, acetone, dimethyl ether, methyl i-propyl ether, polyethylene glycol or xylene, preferably methanol. The physical absorption process is suitably carried out at low temperatures, preferably between −60° C. and 0° C., preferably between −30 and −10° C.

The physical absorption process is carried out by contacting the light products stream in a counter-current upward flow with the liquid absorbent. The absorption process is preferably carried out in a continuous mode, in which the liquid absorbent is regenerated. This regeneration process is well known to the man skilled in the art. The loaded liquid absorbent is suitably regenerated by pressure release (e.g. a flashing operation) and/or temperature increase (e.g. a distillation process). The regeneration is suitably carried out in two or more steps, preferably 3-10 steps, especially a combination of one or more flashing steps and a distillation step.

The regeneration of solvent from the process is also known in the art. Preferably, the present invention involves one integrated solvent regeneration tower.

The present invention may also involve one or more further removal systems, guards or scrubbing units, either as back-up or support to the $CO_2/H_2S$ removal system, or to assist in the reduction and/or removal of other contaminants such as HCN, $NH_3$, COS and $H_2S$, metals, carbonyls, hydrides or other trace contaminants.

The catalytic water shift conversion reaction provides a hydrogen enriched, often highly enriched, syngas, possibly having a $H_2/CO$ ratio above 3, more suitably above 5, preferably above 7, more preferably above 15, possibly 20 or even above.

The water shift conversion reaction is well known in the art. Generally, water, usually in the form of steam, is mixed with the syngas to form carbon dioxide and hydrogen. The catalyst used can be any of the known catalysts for such a reaction, including iron, chromium, copper and zinc. Copper on zinc oxide is a known shift catalyst. A very suitable source for the water required in the shift reaction is the product water produced in the Fischer-Tropsch reaction. Preferably this is the main source, e.g. at least 80% is derived from the Fischer-Tropsch process, preferably at least 90%, more preferably 100%. Thus the need of an external water source is minimised.

In another embodiment of the present invention, a portion of the water shift converted sub-stream is used for hydrogen manufacture, such as in a Pressure Swing Adsorption (PSA). The proportion of the converted sub-stream used for such will generally be less than 10% by volume, preferably approximately 1-7% by volume. The hydrogen manufactured in this way can then be used as the hydrogen source in the hydrocracking of the products provided by the hydrocarbon synthesis section. This arrangement reduces or even eliminates the need for a separate source of hydrogen, e.g. from an external supply, which is otherwise commonly used where available. Thus, the carbonaceous fuel feedstock is able to provide a further reactant required in the overall process of coal to liquid products conversion, increasing the self-sufficiency of the overall process.

One hydrocarbon synthesis process is the Fischer-Tropsch synthesis. The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight. Reaction products which are liquid phase under reaction conditions may be physically separated Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, maganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

Reference to "Groups" and the "Periodic Table" as used herein relate to the "previous IUPAC form" of the Periodic Table such as that described in the $68^{th}$ edition of the Handbook of Chemistry and Physics (CPC Press).

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of, from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ratio is in the range from 1.0 to 1.9 using either directly the syngas or using a recycle.

The gaseous hourly space velocity may vary within wide ranges and is typically in the range from 800 to 10000 Nl/l/h, preferably in the range from 2500 to 7500 Nl/l/h.

The Fischer-Tropsch synthesis may be carried out in a slurry phase regime or an ebullating bed regime, wherein the catalyst particles are kept in suspension by an upward superficial gas and/or liquid velocity.

It will be understood that the skilled person is capable to select the most appropriate conditions for a specific reactor configuration and reaction regime.

In a more preferred embodiment a fixed bed Fischer-Tropsch process is used, especially a multi-tubular fixed bed. Such a multi-tubular fixed bed reactor usually comprises a normally substantially vertically extending vessel, a plurality of open-ended reactor tubes arranged in the vessel parallel to its central longitudinal axis of which the upper ends are fixed to an upper tube plate and in fluid communication with a fluid inlet chamber above the upper tube plate and of which the lower ends are fixed to a lower tube plate and in fluid communication with an effluent collecting chamber below the lower tube plate, optionally liquid supply means for supplying liquid to the fluid inlet chamber, gas supply means for supplying gas to the fluid inlet chamber, and an effluent outlet arranged in the effluent collecting chamber.

The upper ends of the reactor tubes are provided with tubes extending through the upper tube plate and/or through the bottom of a horizontal tray arranged above the upper tube plate.

During normal operation the reactor tubes are filled with catalyst particles. To convert for example synthesis gas into hydrocarbons, synthesis gas is supplied through the fluid inlet chamber into the upper ends of the reactor tubes and passed through the reactor tubes. Effluents leaving the lower ends of the reactor tubes are collected in the effluent collecting chamber and removed from the effluent collecting chamber through the effluent outlet.

To distribute the heat of reaction generated during the conversion uniformly over the reactor tubes, and to improve heat transfer from the interiors of said tubes to the inner walls of the reactor tubes, liquid may be recycled over the reactor tubes. Liquid leaving the lower ends of the reactor tubes is collected in the effluent collecting chamber and removed from the effluent collecting chamber through the effluent outlet.

The heat of reaction is removed by a heat transfer fluid which is passed along the outer surfaces of the reactor tubes. Such a multi-tube reactor can also be used for the catalytic conversion of a liquid in the presence of a gas.

A commercial multi-tube reactor for such processes suitably will have a diameter of about 5 or 7 m and between about 5 000 reactor tubes with a diameter of about 45 mm to 15 000 reactor tubes with a diameter of about 25 mm. The length of a reactor tube will be about 10 to 15 m.

The hydrocarbon synthesis section may be a single stage or multi-stage process, each stage having one or more reactors. In a multi-stage process, the hydrogen enriched conversion sub-stream could be combined with syngas prior to one or more of the stages, either directly or indirectly.

The method of the present invention can provide a syngas with a $H_2/CO$ ratio more suitable for efficient hydrocarbon synthesis carried out on a given catalyst, such as in one or more Fischer-Tropsch reactors, as well as being able to accommodate variation in the $H_2/CO$ ratio of syngas formed from different qualities of feedstock fuels. In addition, one ore more sub-streams may be used for the production of high $H_2/CO$ ratio syngas, e.g. for use as additional feed for a second, third etc. stage in the Fischer-Tropsch process, or for the manufacture of hydrogen.

The invention claimed is:

1. A process for the synthesis of hydrocarbons from a solid carbonaceous fuel, comprising the steps of:
    gasifying the solid carbonaceous fuel with a supply of oxygen to provide syngas;
    removing solids from the syngas;
    dividing the syngas into at least three sub-streams, two of which undergo a catalytic water shift conversion reaction and one unshifted sub-stream;
    combining the unshifted sub-stream with one of the shifted sub-streams to provide a combined syngas having an increased H2/CO ratio;
    feeding said combined syngas into a hydrocarbon synthesis section to produce the hydrocarbons, in which a hydrocarbon synthesis process comprises at least 2 stages, wherein the remaining, shifted sub-stream is used as additional feed for the further stage(s).

2. The process of claim 1, followed by hydroconversion of the hydrocarbons made in the hydrocarbon synthesis process.

3. The process of claim 1, wherein the carbonaceous fuel includes one or more of coal, brown coal, and peat.

4. The process of claim 1, wherein the carbonaceous fuel includes coal.

* * * * *